United States Patent
Kwon et al.

(10) Patent No.: US 10,703,870 B2
(45) Date of Patent: Jul. 7, 2020

(54) COMPOSITION FOR OPTICAL FILM, AND OPTICAL FILM COMPRISING SAME

(71) Applicant: LG CHEM, LTD., Seoul (KR)

(72) Inventors: Tae Gyun Kwon, Daejeon (KR); Su Young Ryu, Daejeon (KR); Young Shin Lee, Daejeon (KR); Moon Soo Park, Daejeon (KR); Seong Min Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 44 days.

(21) Appl. No.: 15/552,757

(22) PCT Filed: Mar. 11, 2016

(86) PCT No.: PCT/KR2016/002454
§ 371 (c)(1),
(2) Date: Aug. 22, 2017

(87) PCT Pub. No.: WO2016/144133
PCT Pub. Date: Sep. 15, 2016

(65) Prior Publication Data
US 2018/0051144 A1  Feb. 22, 2018

(30) Foreign Application Priority Data

Mar. 12, 2015 (KR) .................. 10-2015-0034557

(51) Int. Cl.
| | | |
|---|---|---|
| *C09K 11/02* | (2006.01) | |
| *C08J 5/18* | (2006.01) | |
| *C08F 222/10* | (2006.01) | |
| *C08L 23/22* | (2006.01) | |
| *C08L 33/08* | (2006.01) | |
| *G02B 1/04* | (2006.01) | |
| *G02B 5/30* | (2006.01) | |
| *G02F 1/13357* | (2006.01) | |

(52) U.S. Cl.
CPC ............ *C08J 5/18* (2013.01); *C08F 222/1006* (2013.01); *C08L 23/22* (2013.01); *C08L 33/08* (2013.01); *G02B 1/04* (2013.01); *G02B 5/305* (2013.01); *G02B 5/3008* (2013.01); *G02F 1/1336* (2013.01); *G02F 2001/133614* (2013.01); *G02F 2201/50* (2013.01); *G02F 2202/36* (2013.01)

(58) Field of Classification Search
USPC ..................................................... 252/301.36
See application file for complete search history.

(56) References Cited

U.S. PATENT DOCUMENTS

| | | |
|---|---|---|
| 6,207,229 B1 | 3/2001 | Bawendi et al. |
| 6,225,198 B1 | 5/2001 | Alivisatos et al. |
| 6,322,901 B1 | 11/2001 | Bawendi et al. |
| 6,861,155 B2 | 3/2005 | Bawendi et al. |
| 6,949,206 B2 | 9/2005 | Whiteford et al. |
| 7,267,865 B2 | 9/2007 | Hetzler et al. |
| 7,374,807 B2 | 5/2008 | Parce et al. |
| 7,572,393 B2 | 8/2009 | Whiteford et al. |
| 7,645,397 B2 | 1/2010 | Parce et al. |
| 2002/0066401 A1 | 6/2002 | Peng et al. |
| 2008/0118755 A1 | 5/2008 | Whiteford et al. |
| 2008/0237540 A1 | 10/2008 | Dubrow |
| 2008/0277626 A1* | 11/2008 | Yang .................. C09D 11/30 252/301.36 |
| 2008/0281010 A1 | 11/2008 | Lefas et al. |
| 2010/0110728 A1 | 5/2010 | Dubrow et al. |
| 2015/0047765 A1 | 2/2015 | Vo et al. |
| 2015/0352854 A1* | 12/2015 | Marrs ................. B41J 2/17513 347/86 |

FOREIGN PATENT DOCUMENTS

| | | |
|---|---|---|
| KR | 10-2004-0110516 A | 12/2004 |
| KR | 10-2011-0038191 A | 4/2011 |
| KR | 10-2011-0048397 A | 5/2011 |
| KR | 10-2012-0074114 A | 7/2012 |
| KR | 10-2013-0009027 A | 1/2013 |
| KR | 10-2013-0036059 A | 4/2013 |
| KR | 10-2013-0050819 A | 5/2013 |
| KR | 10-2014-0137676 A | 3/2014 |
| WO | 2014126698 | 8/2014 |

OTHER PUBLICATIONS

Huashan et al., "Polymer Physics," Textile Industry Press, p. 50-51 (1982).

\* cited by examiner

*Primary Examiner* — Monique R Peets
(74) *Attorney, Agent, or Firm* — Dentons US LLP

(57) ABSTRACT

An optical film, a production method therefor, a lighting device and a display device are provided. The present application is capable of providing an optical film having excellent color purity and efficiency, the optical film being capable of providing a lighting device having excellent color characteristics. The optical film of the present application can stably maintain the above described excellent characteristics for a long period of time. The optical film of the present application can be used in various applications, including various lighting devices, photovoltaic cell applications, optical filters or photoconverters.

19 Claims, 2 Drawing Sheets

[Figure 1]
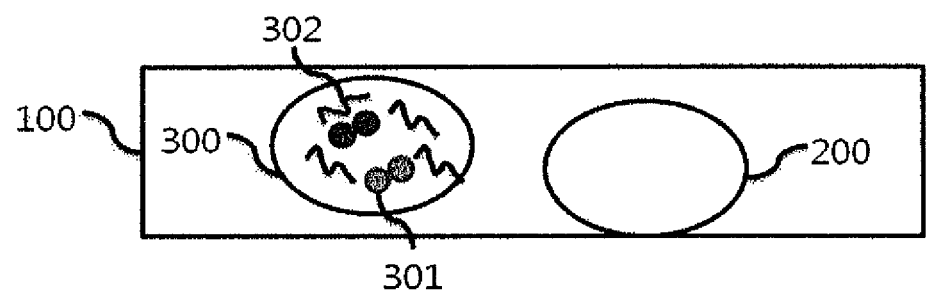
[Figure 2]
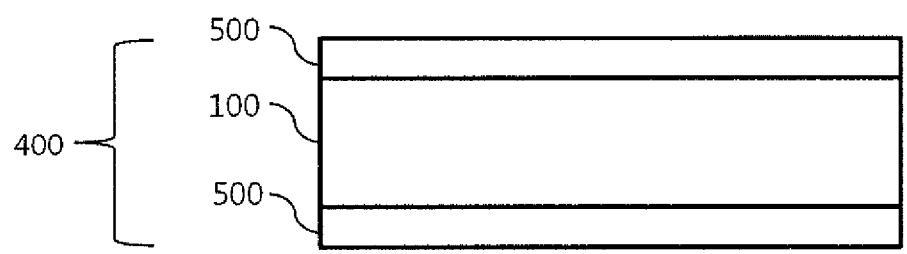
[Figure 3]
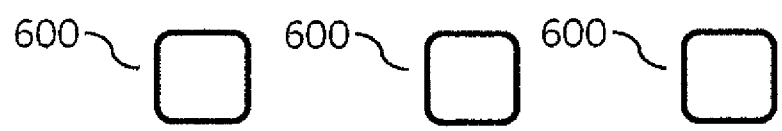
[Figure 4]
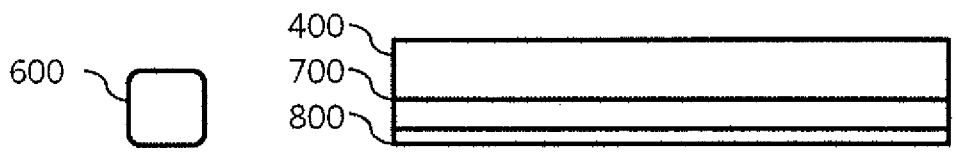

[Figure 5]
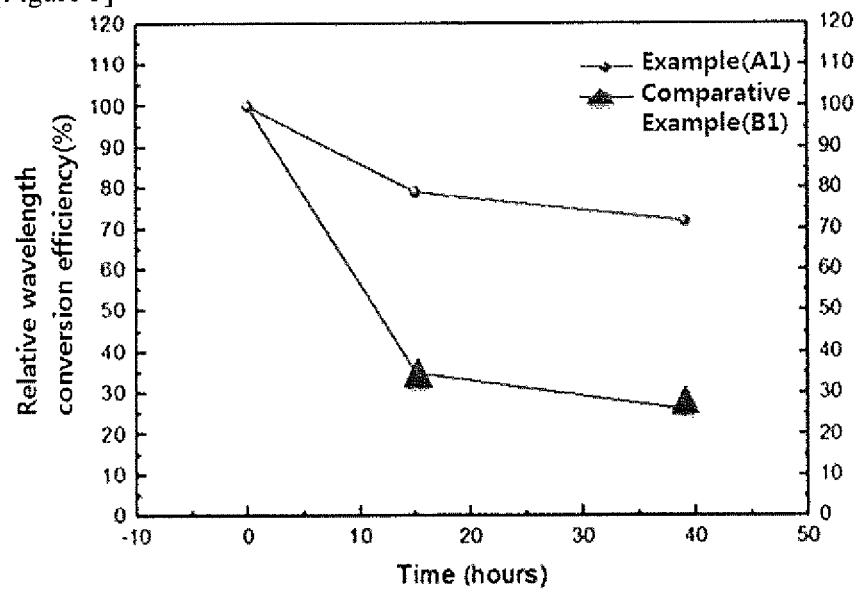

COMPOSITION FOR OPTICAL FILM, AND OPTICAL FILM COMPRISING SAME

CROSS-REFERENCE TO RELATED APPLICATIONS

This application is a National Stage Entry of International Application No. PCT/KR2016/002454, filed on Mar. 11, 2016, and claims the benefit of and priority to Korean Application No. 10-2015-0034557, filed on Mar. 12, 2015, all of which are hereby incorporated by reference in their entireties for all purposes as if fully set forth herein.

TECHNICAL FIELD

The present application relates to a composition for an optical film, an optical film comprising the same, a method for producing an optical film, and a lighting device and a display device, comprising the optical film.

BACKGROUND ART

Lighting devices are used in various applications. The lighting device may be, for example, used as a BLU (backlight unit) of a display such as an LCD (liquid crystal display), a TV, a computer, a mobile phone, a smart phone, a personal digital assistant (PDA), a gaming device, an electronic reading device or a digital camera. Besides, the lighting device may be used for indoor or outdoor lighting, stage lighting, decorative lighting, accent lighting or museum lighting, and the like, as well as special wavelength lighting required for horticulture and biology.

A typical lighting device is, for example, one used as a BLU of a LCD, and the like, and there is a device which emits a white light by combining phosphors such as a blue LED (Light Emitting Diode) and a YAG (Yttrium aluminum garnet).

In addition, recently, researches related to a lighting device emitting a white light by using wavelength conversion particles, for example, quantum dots, in which the color of light to be emitted varies depending on the size of particles, have been steadily progressing.

In particular, studies for solving problems to reduce the efficiency due to exposure to gases such as oxygen and increasing wavelength conversion efficiency of quantum dots themselves, and the like have been actively carried out.

(Patent Document 1) Korean Laid-Open Patent Publication No. 2011-0048397

(Patent Document 2) Korean Patent Publication No. 2011-0038191

DISCLOSURE

Technical Problem

The present application provides a composition for an optical film capable of achieving high wavelength conversion efficiency by minimizing wavelength conversion efficiency reduction of wavelength conversion particles due to oxygen, etc., an optical film containing the same, and a method for producing an optical film.

The present application also provides a lighting device and a display device, comprising the optical film to have excellent optical characteristics.

Technical Solution

The present application, which is conceived to solve the above-mentioned problems, relates to a composition for an optical film comprising a hydrophilic polymerizable compound; a hydrophobic polymerizable compound phase-separated from the hydrophilic polymerizable compound after polymerization; wavelength conversion particles; and a polybutadiene compound.

In one example, the polybutadiene compound may be a homopolymer or copolymer of butadiene monomer. The copolymer may be, for example, a (meth)acryloyl functionalized polybutadiene or an epoxy functionalized polybutadiene.

In one example, the polybutadiene compound may have a solubility parameter of less than 10 $(cal/cm^3)^{1/2}$.

The present application also relates to an optical film having a continuous phase matrix; and a wavelength conversion layer comprising an emulsion region dispersed in the continuous phase matrix, and comprising wavelength conversion particles present in the continuous phase or the emulsion region of the wavelength conversion layer and a polybutadiene compound.

In one example, the continuous phase matrix, which is a relatively hydrophilic region relative to the emulsion region, may comprise wavelength conversion particles, and the weight ratio of the wavelength conversion particles included in the continuous phase matrix may be 10% or less based on the weight of the entire wavelength conversion particles included in the wavelength conversion layer.

In another example, the emulsion region, which is a relatively hydrophobic region relative to the continuous phase matrix, may comprise wavelength conversion particles, and the weight ratio of the wavelength conversion particles included in the emulsion region may be 90% or more based on the weight of the entire wavelength conversion particles included in the wavelength conversion layer.

The emulsion region may comprise, for example, an A region comprising first wavelength conversion particles capable of absorbing light within a range of 420 nm to 490 nm to emit light within a range of 490 nm to 580 nm and/or a B region comprising second wavelength conversion particles capable of absorbing light within a range of 420 nm to 490 nm to emit light within a range of 580 nm to 780 nm.

The present application also relates to a method for producing an optical film comprising a step of mixing wavelength conversion particles and a polybutadiene compound with a hydrophilic polymerizable compound and a hydrophobic polymerizable compound phase-separated from the hydrophilic polymerizable compound after polymerization.

The present application also relates to a lighting device and a display device, comprising the above optical film.

Advantageous Effects

The present application may provide a composition for an optical film capable of forming an optical film having improved durability or optical characteristics by preventing oxidation of wavelength conversion particles that can be induced by heat or light and ultimately preventing reduction of wavelength conversion efficiency of the wavelength conversion particles.

The present application may also provide an optical film having suitable physical properties for a film, for example excellent adhesion with other layers, durability or optical characteristics, and the like through the phase separation structure of the wavelength conversion layer formed from the composition for an optical film.

BRIEF DESCRIPTION OF DRAWINGS

FIG. 1 is a schematic diagram schematically illustrating the inside of a wavelength conversion layer.

FIG. 2 is a schematic diagram of an exemplary optical film.

FIGS. 3 and 4 are schematic diagrams of exemplary lighting devices.

FIG. 5 shows the result of evaluating relative wavelength conversion efficiency of the optical film according to the present application.

BEST MODE

Hereinafter, the present application will be described in more detail by way of examples and drawings, but these examples are merely examples limited to the gist of the present application. Furthermore, it is obvious to those skilled in the art that the present application is not limited to the process conditions set forth in the following examples, but may be optionally selected within the scope of the conditions necessary to achieve the object of the present application.

The present application relates to a composition for an optical film comprising a hydrophilic polymerizable compound; a hydrophobic polymerizable compound phase-separated from the hydrophilic polymerizable compound after polymerization; wavelength conversion particles; and a polybutadiene compound.

In the present application, the term "optical film" may mean a film used in an optical device for various applications. For example, the optical film may mean a film formed so as to be capable of absorbing light having a predetermined wavelength to emit light having the same or different wavelength as the absorbed light.

The composition for an optical film of the present application comprises a hydrophilic polymerizable compound and a hydrophobic polymerizable compound phase-separated from the hydrophilic polymerizable compound after polymerization, so that a hydrophilic region and a hydrophobic region phase-separated from the hydrophilic region may be formed after polymerization.

The composition for an optical film of the present application comprises a hydrophilic polymerizable compound and a hydrophobic polymerizable compound phase-separated from the hydrophilic polymerizable compound after polymerization, and allow for wavelength conversion particles to be positioned in a region formed by polymerizing the hydrophilic polymerizable compound or a region formed by polymerizing the hydrophobic polymerizable compound, so that in the region where the wavelength conversion particles exist, other factors, such as an initiator and a cross-linking agent, that may adversely affect physical properties of the wavelength conversion particles may be more effectively controlled to form an optical film having excellent durability.

In addition, the composition for an optical film of the present application comprises a polybutadiene compound, but by allowing the polybutadiene compound to be capable of being included in the same region as the wavelength conversion particles among the regions formed by phase separation after polymerization, it is possible to prevent oxidation of the wavelength conversion particles due to heat and light, and ultimately to form an optical film having excellent wavelength conversion efficiency.

The composition for an optical film of the present application comprises a hydrophilic polymerizable compound and a hydrophobic polymerizable compound phase-separated from the hydrophilic polymerizable compound after polymerization.

In the present application, the criteria for distinguishing hydrophilicity and hydrophobicity of the hydrophilic polymerizable compound and the hydrophobic polymerizable compound are not particularly limited, for example, as long as the two compounds may form phase-separated regions when they have been mixed with each other while being relatively hydrophilic or hydrophobic. In one example, the distinction between hydrophilicity and hydrophobicity can be performed by a so-called solubility parameter.

In the present application, the solubility parameter may refer to the solubility parameter of a homopolymer formed by polymerization of the corresponding hydrophilic or hydrophobic polymerizable compound, thereby determining the degree of hydrophilicity and hydrophobicity of the corresponding compound. The manner of obtaining the solubility parameter is not particularly limited and may follow a method known in the art. For example, the parameter may be calculated or obtained according to a method known in the art as a so-called HSP (Hansen solubility parameter).

In one example, the hydrophilic polymerizable compound may be a radically polymerizable compound having a solubility parameter of 10 $(cal/cm^3)^{1/2}$ or more. In another example, the solubility parameter of the hydrophilic polymerizable compound may be about 11 $(cal/cm^3)^{1/2}$ or more, 12 $(cal/cm^3)^{1/2}$ or more, 13 $(cal/cm^3)^{1/2}$ or more, 14 $(cal/cm^3)^{1/2}$ or more, or 15 $(cal/cm^3)^{1/2}$ or more. In another example, the solubility parameter of the hydrophilic polymerizable compound may be about 40 $(cal/cm^3)^{1/2}$ or less, about 35 $(cal/cm^3)^{1/2}$ or less, or about 30 $(cal/cm^3)^{1/2}$ or less.

In one example, the hydrophilic polymerizable compound may be any one selected from the group consisting of a compound of Formula 1 below: a compound of Formula 2 below; a compound of Formula 3 below; a compound of Formula 4 below; a radically polymerizable nitrogen-containing compound; and a radically polymerizable compound containing (meth)acrylic acid or a salt thereof.

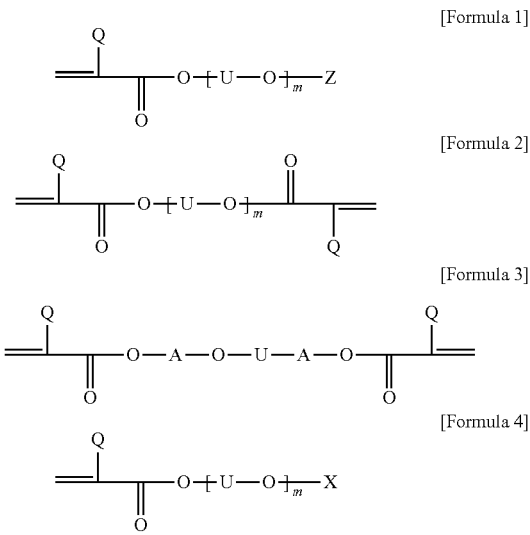

In Formulas 1 to 4, each Q is independently hydrogen or an alkyl group, each U is independently an alkylene group, each A is independently an alkylene group which may be substituted with a hydroxyl group, Z is a hydrogen, an alkoxy group or a monovalent hydrocarbon group, X is a hydroxyl group or a cyano group, and m and n are any number.

In the present application, the term "alkyl group" may mean an alkyl group having 1 to 20 carbon atoms, 1 to 16 carbon atoms, 1 to 12 carbon atoms, 1 to 8 carbon atoms or 1 to 4 carbon atoms, unless otherwise specified. The alkyl group may be linear, branched or cyclic. In addition, the alkyl group may be optionally substituted with one or more substituents.

In the present application, the term "alkylene group" may mean an alkylene group having 1 to 20 carbon atoms, 1 to 16 carbon atoms, 1 to 12 carbon atoms, 1 to 8 carbon atoms or 1 to 4 carbon atoms, unless otherwise specified. The alkylene group may be linear, branched or cyclic. Also, the alkylene group may be optionally substituted with one or more substituents.

In the present application, the term "epoxy group" may mean cyclic ether having three ring constituent atoms or a compound containing the cyclic ether or a monovalent residue derived therefrom, unless otherwise specified. As the epoxy group, a glycidyl group, an epoxyalkyl group, a glycidoxyalkyl group or an alicyclic epoxy group and the like can be exemplified. Here, the alicyclic epoxy group may mean a monovalent residue derived from a compound including an aliphatic hydrocarbon ring structure and a structure in which two carbon atoms forming the aliphatic hydrocarbon ring also form an epoxy group. As the alicyclic epoxy group, an alicyclic epoxy group having 6 to 12 carbon atoms can be exemplified, and for example, a 3,4-epoxycyclohexylethyl group and the like can be exemplified.

In the present application, the term "alkoxy group" may mean an alkoxy group having 1 to 20 carbon atoms, 1 to 16 carbon atoms, 1 to 12 carbon atoms, 1 to 8 carbon atoms or 1 to 4 carbon atoms, unless otherwise specified. The alkoxy group may be linear, branched or cyclic. In addition, the alkoxy group may be optionally substituted with one or more substituents.

In the present application, the term "monovalent hydrocarbon group" may mean a monovalent residue derived from a compound consisting of carbon and hydrogen or a derivative of such a compound, unless otherwise specified. For example, the monovalent hydrocarbon group may contain 1 to 25 carbon atoms. As the monovalent hydrocarbon group, an alkyl group, an alkenyl group, an alkynyl group or an aryl group and the like can be exemplified.

In the present application, the substituent which may be optionally substituted in the alkyl group, alkoxy group, alkylene group, epoxy group or monovalent hydrocarbon group can be exemplified by a hydroxy group; halogen such as chlorine or fluorine; an epoxy group such as a glycidyl group, an epoxyalkyl group, a glycidoxyalkyl group or an alicyclic epoxy group; an acryloyl group; a methacryloyl group; an isocyanate group; a thiol group; an aryloxy group; or a monovalent hydrocarbon group, and the like, but is not limited thereto.

In Formulas 1, 2 and 4 above, m and n are any number and can be, for example, each independently a number within a range of 1 to 20, 1 to 16 or 1 to 12.

As the radically polymerizable nitrogen-containing compound, a radically polymerizable amide group-containing compound, a radically polymerizable amino group-containing compound, a radically polymerizable imide group-containing compound, or a radically polymerizable cyano group-containing compound and the like can be used. The radically polymerizable amide group-containing compound can be exemplified by, for example, (meth)acrylamide or N,N-dimethyl (meth)acrylamide, N,N-diethyl (meth)acrylamide, N-isopropyl (meth)acrylamide, N-methylol (meth) acrylamide, diacetone (meth)acrylamide, N-vinylacetamide, N,N'-methylenebis (meth)acrylamide, N,N-dimethylaminopropyl (meth)acrylamide, N-vinylpyrrolidone, N-vinylcaprolactam or (meth)acryloylmorpholine, and the like, the radically polymerizable amino group-containing compound can be exemplified by aminoethyl (meth)acrylate, N,N-dimethylaminoethyl (meth)acrylate or N,N-dimethylaminopropyl (meth)acrylate, and the like, the radically polymerizable imide group-containing compound can be exemplified by N-isopropylmaleimide, N-cyclohexylmaleimide or itaconimide, and the like, and the radically polymerizable cyano group-containing compound can be exemplified by acrylonitrile or methacrylonitrile, and the like, without being limited thereto.

In addition, the salt of (meth)acrylic acid can be exemplified by, for example, a salt of an alkali metal including lithium, sodium and potassium, or a salt of an alkali earth metal including magnesium, calcium, strontium and barium, with (meth)acrylic acid, and the like, but is not limited thereto.

The hydrophilic polymerizable compound can form, for example, a continuous phase matrix in the wavelength conversion layer after polymerization.

The hydrophobic polymerizable compound contained in the composition for an optical film, which is phase-separated from the hydrophilic polymerizable compound after polymerization, may have, for example, a solubility parameter of less than 10 $(cal/cm^3)^{1/2}$. In another example, the solubility parameter of the hydrophobic polymerizable compound may be, for example, 3 $(cal/cm^3)^{1/2}$ or more, 4 $(cal/cm^3)^{1/2}$ or more, or about 5 $(cal/cm^3)^{1/2}$ or more.

The difference in solubility parameters of the hydrophilic polymerizable compound and the hydrophobic polymerizable compound can be controlled for realizing an appropriate phase separation structure of the optical film.

In one example, the difference of solubility parameter between the hydrophilic polymerizable compound and the hydrophobic polymerizable compound may be 5 $(cal/cm^3)^{1/2}$ or more, 6 $(cal/cm^3)^{1/2}$ or more, 7 $(cal/cm^3)^{1/2}$ or more, or about 8 $(cal/cm^3)^{1/2}$ or more. The difference is a value obtained by subtracting a small value from a large value among the solubility parameters. The upper limit of the difference is not particularly limited. The larger the difference in the solubility parameter, the more appropriate phase separation structure can be formed. The upper limit of the difference may be, for example, 30 $(cal/cm^3)^{1/2}$ or less, 25 $(cal/cm^3)^{1/2}$ or less, or about 20 $(cal/cm^3)^{1/2}$ or less.

The hydrophobic polymerizable compound, which satisfies the aforementioned solubility parameter range, may be any one selected from the group consisting of a compound Formula 5 below, a compound Formula 6 below and a compound Formula 7.

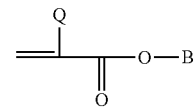

[Formula 5]

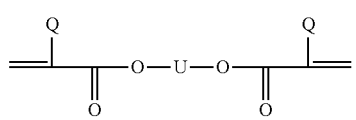

[Formula 6]

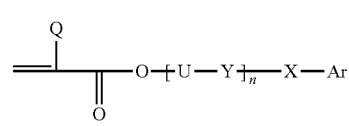

[Formula 7]

In Formulas 5 to 7, each Q is independently hydrogen or an alkyl group, each U is independently an alkylene group, an alkenylene group or an alkynylene group or an arylene group, B is a linear or branched alkyl group having 5 or more carbon atoms or an alicyclic hydrocarbon group, Y is an oxygen atom or a sulfur atom, X is an oxygen atom, a sulfur atom or an alkylene group, Ar is an aryl group, and n is any number.

In the present application, the term "alkenylene group or alkynylene group" may mean an alkenylene group or an alkynylene group, having 2 to 20 carbon atoms, 2 to 16 carbon atoms, 2 to 12 carbon atoms, 2 to 8 carbon atoms or 2 to 4 carbon atoms, unless otherwise specified. The alkenylene group or alkynylene group may be linear, branched or cyclic. In addition, the alkenylene group or alkynylene group may be optionally substituted with one or more substituents.

In the present application, the term "arylene group" may mean a divalent residue derived from a compound containing a structure in which benzene or two or more benzenes are condensed or bonded, or a derivative thereof, unless otherwise specified. The arylene group may have, for example, a structure including benzene, naphthalene or fluorene, and the like.

In the present application, the term "aryl group" may mean a monovalent residue derived from a compound containing a structure in which a benzene ring or two or more benzene rings are condensed or bonded, or a derivative thereof, unless otherwise specified. The range of the aryl group may include a so-called aralkyl group or an arylalkyl group as well as a functional group ordinarily called an aryl group. The aryl group may be, for example, an aryl group having 6 to 25 carbon atoms, 6 to 21 carbon atoms, 6 to 18 carbon atoms or 6 to 12 carbon atoms. The aryl group may be exemplified by a phenyl group, a phenoxy group, a phenoxyphenyl group, a phenoxybenzyl group, dichlorophenyl, chlorophenyl, a phenylethyl group, a phenylpropyl group, a benzyl group, a tolyl group, a xylyl group or a naphthyl group, and the like. In addition, the aryl group may be optionally substituted with one or more substituents.

In the present application, the substituent which may be optionally substituted in the alkenylene group, alkynylene group, arylene group or aryl group may be exemplified by a hydroxyl group, halogen such as chlorine or fluorine, an alkyl group or an aryloxy group, but is not limited thereto.

In one example, in Formula 5, Q may be hydrogen or an alkyl group, and B may be a linear or branched alkyl group having 5 or more carbon atoms or an alicyclic hydrocarbon group.

In Formula 5, B may be a linear or branched alkyl group having 5 or more carbon atoms, 7 or more carbon atoms, or 9 or more carbon atoms. Thus, the compound containing a relatively long alkyl group has been known as a relatively nonpolar compound. The upper limit of the carbon atom number in the linear or branched alkyl group is not particularly limited, and for example, the alkyl group may be an alkyl group having 20 or less carbon atoms.

In another example, in Formula 5, B may be an alicyclic hydrocarbon group, for example, an alicyclic hydrocarbon group having 3 to 20 carbon atoms, 3 to 16 carbon atoms or 6 to 12 carbon atoms, and examples of such a hydrocarbon group may include a cyclohexyl group or an isobornyl group and the like. Thus, the compound having an alicyclic hydrocarbon group has been known as a relatively nonpolar compound.

In one example, in Formula 6, Q may be hydrogen or an alkyl group, and U may be an alkenylene group, an alkynylene group or an arylene group.

In one example, in Formula 7, Q may be hydrogen or an alkyl group, U may be an alkylene group, Y may be a carbon atom, an oxygen atom or a sulfur atom, X may be an oxygen atom, a sulfur atom or an alkylene group, Ar may be an aryl group, and n may be any number, for example, a positive integer within the range of 1 to 20, 1 to 16 or 1 to 12.

The hydrophobic polymerizable compound can form, for example, an emulsion region in the wavelength conversion layer after polymerization.

When the hydrophobic polymerizable compound and the hydrophilic polymerizable compound are included in the composition together with the wavelength conversion particles, the wavelength conversion layer formed from such a composition can be phase separated after polymerization to form the respective regions, and the wavelength conversion particles can be located in the region formed by the hydrophilic polymerizable compound or the region formed by the hydrophobic polymerizable compound to promote the desired dispersibility and stability of the wavelength conversion particles.

The ratio of the hydrophilic polymerizable compound and the hydrophobic polymerizable compound is not particularly limited.

For example, the composition for an optical film may comprise 10 to 100 parts by weight of the hydrophobic polymerizable compound relative to 100 parts by weight of the hydrophilic polymerizable compound.

In another example, the composition for an optical film may comprise 50 to 95 parts by weight of a hydrophilic polymerizable compound and 5 to 50 parts by weight of a hydrophobic polymerizable compound, or 50 to 95 parts by weight of a hydrophobic polymerizable compound and 5 to 50 parts by weight of a hydrophilic polymerizable compound. In the present application, the term "parts by weight" means the weight ratio between components, unless otherwise specified.

The composition for an optical film of the present application may further comprise a radical initiator for polymerization of a hydrophilic compound and a hydrophobic compound.

The kind of the radical initiator contained in the composition for an optical film of the present application is not particularly limited. As the initiator, a radically thermal initiator or a photoinitiator capable of generating a radical such that a polymerization reaction can be induced by application of heat or irradiation of light can be utilized.

As the thermal initiator, for example, one or two or more of azo compounds such as 2,2-azobis-2,4-dimethylvaleronitrile (V-65, manufactured by Wako), 2,2-azobisisobutyronitrile (V-60, manufactured by Wako) or 2,2-azobis-2-methylbutyronitrile (V-59, manufactured by Wako); peroxyester compounds such as dipropyl peroxydicarbonate (Peroyl NPP, manufactured by NOF), diisopropyl peroxydicarbonate (Peroyl IPP, manufactured by NOF), bis-4-butylcyclohexyl peroxydicarbonate (Peroyl TCP, manufactured by NOF), diethoxy peroxydicarbonate (Peroyl EEP, manufactured by NOF), diethoxyhexyl peroxydicarbonate (Peroyl OPP, manufactured by NOF), hexyl peroxydicarbonate (Perhexyl ND, manufactured by NOF), dimethoxybutyl peroxydicarbonate (Peroyl MBP, manufactured by NOF), bis(3-methoxy-3-methoxybutyl) peroxydicarbonate (Peroyl SOP, manufactured by NOF), hexyl peroxypivalate (Perhexyl PV, manufactured by NOF), amyl peroxypivalate (Luperox 546M75, manufactured by Atofina), butyl peroxypivalate (Perbutyl, manufactured by NOF) or trimethylhexanoyl peroxide (Peroyl 355, manufactured by NOF); peroxy dicarbonate compounds such as dimethyl hydroxybutyl peroxaneodecanoate (Luperox 610M75, manufactured by Atofina), amyl peroxyneodecanoate (Luperox 546M75, manufactured by Atofina) or butyl peroxyneodecanoate (Luperox 10M75, manufactured by Atofina); acyl peroxides such as 3,5,5-trimethylhexanoyl peroxide or dibenzoyl peroxide; ketone peroxides; dialkyl peroxides; peroxyketals; or peroxide initiators such as hydroperoxide, and the like may be used.

As the photoinitiator, benzoin, hydroxy ketone, amino ketone or phosphine oxide photoinitiators may be used. Specifically, benzoin, benzoin methyl ether, benzoin ethyl ether, benzoin isopropyl ether, benzoin n-butyl ether, benzoin isobutyl ether, acetophenone, dimethylamino acetophenone, 2,2-dimethoxy-2-phenylacetophenone, 2,2-diethoxy-2-phenylacetophenone, 2-hydroxy-2-methyl-1-phenylpropan-1-one, 1-hydroxycyclohexyl phenyl ketone, 2-methyl-1-[4-(methylthio)phenyl]-2-morpholino-propan-1-one, 4-(2-hydroxyethoxy)phenyl-2-(hydroxy-2-propyl) ketone, benzophenone, p-phenylbenzophenone, 4,4'-diethylaminobenzophenone, dichlorobenzophenone, 2-methylanthraquinone, 2-ethyl-anthraquinone, 2-t-butyl anthraquinone, 2-amino anthraquinone, 2-methylthioxanthone, 2-ethylthioxanthone, 2-chlorothioxanthone, 2,4-dimethylthioxanthone, 2,4-diethyl-thioxanthone, benzyl dimethyl ketal, acetophenone dimethyl ketal, p-dimethylamino benzoic acid ester, oligo[2-hydroxy-2-methyl-1-[4-(1-methylvinyl)phenyl]propanone] and 2,4,6-trimethyl-benzoyl-diphenyl-phosphine oxide, and the like, may be used, without being limited thereto.

In the composition for an optical film of the present application, those having high solubility in the hydrophilic or hydrophobic component among the initiators can be appropriately selected and used.

The content of the initiator in the composition for an optical film of the present application is not particularly limited, and for example, the initiator may be included in the composition for an optical film in a range of 0.1% by weight to 15% by weight relative to the total weight of the composition for an optical film, but is not limited thereto.

The composition for an optical film of the present application comprises wavelength conversion particles.

In the present application, the term "wavelength conversion particle" means a nanoparticle formed so as to be capable of absorbing light of a certain wavelength and emitting light of the same or different wavelength.

In the present application, the term "nanoparticle," which is a particle having a nano-level dimension, may mean a particle having, for example, an average particle size of about 100 nm or less, 90 nm or less, 80 nm or less, 70 nm or less, 60 nm or less, 50 nm or less, 40 nm or less, 30 nm or less, 20 nm or less, or about 15 nm or less. The shape of the nanoparticle is not particularly limited and may be spherical, ellipsoidal, polygonal or amorphous, and the like.

The wavelength conversion particle may be a particle capable of absorbing light of a predetermined wavelength and emitting light of the same or a different wavelength.

In one example, the wavelength conversion particle may be a first wavelength conversion particle (hereinafter, possibly referred to as a green particle) that absorbs light of any one wavelength within a range of 420 to 490 nm and emits light of any one wavelength within a range of 490 to 580 nm, or a second wavelength conversion particle (hereinafter, possibly referred to as a red particle) that absorbs light of any one wavelength within a range of 420 to 490 nm and emits light of any one wavelength within a range of 580 to 780 nm.

For example, in order to obtain an optical film having a wavelength conversion layer capable of emitting white light, the red particles and/or green particles may be contained in the composition together in an appropriate ratio.

As the wavelength conversion particles, those exhibiting such an action can be used without particular limitation. A representative example of such a particle may be exemplified by a nanostructure referred to as a so-called quantum dot, but is not limited thereto.

The wavelength conversion particles are called wavelength conversion particles for convenience in the present application, but may be also in the form of particles, and for example, may be a shape such as nanowires, nanorods, nanotubes, branched nanostructures, nanotetrapods or tripods, in which such a shape may be also included in the wavelength conversion particles defined in the present application. In the present application, the term "nanostructure" may include similar structures having at least one region or characteristic dimension having a dimension of less than about 500 nm, less than about 200 nm, less than about 100 nm, less than about 50 nm, less than about 20 nm or less than about 10 nm. The branch may contain similar structures. In general, regions or characteristic dimensions may exist along the shortest axis of the structure, but are not limited thereto. The nanostructure may be, for example, substantially crystalline, substantially monocrystalline, polycrystalline or amorphous structure, or a combination of the above structure.

Quantum dots or other nanoparticles that can be used in the present application can be formed using any suitable material, for example, an inorganic conductive or semiconductive material as an inorganic material. Suitable semiconductor materials may be exemplified by Group II-VI, III-V, IV-VI, I-III-VI and IV semiconductors. More specifically, Si, Ge, Sn, Se, Te, B, C (including diamond), P, BN, BP, BAs, AlN, AlP, AlAs, AlSb, GaN, GaP, GaAs, GaSb, InN, InP, InAs, InSb, AlN, AlP, AlAs, AlSb, GaN, GaP, GaAs, GaSb, ZnO, ZnS, ZnSe, ZnTe, CdS, CdSe, CdSeZn, CdTe, HgS, HgSe, HgTe, BeS, BeSe, BeTe, MgS, MgSe, GeS, GeSe, GeTe, SnS, SnSe, SnTe, PbO, PbS, PbSe, PbTe, CuF, CuCl, CuBr, CuI, $Si_3N_4$, $Ge_3N_4$, $Al_2O_3$, $(Al, Ga, In)_2 (S, Se, Te)_3$, $Al_2CO$, $CuInS_2$, $CuInSe_2$, $CuInS_xSe_{2-x}$, and suitable combinations of two or more of the semiconductors can be exemplified, without being limited thereto.

In one example, the semiconductor nanocrystals or other nanostructures may also comprise a dopant such as a p-type dopant or an n-type dopant. The nanoparticles that may be used in the present application may also comprise II-VI or III-V semiconductors. Examples of II-VI or III-V semiconductor nanocrystals and nanostructures include any combination of a periodic table Group II element such as Zn, Cd, and Hg with a periodic table Group VI element such as S, Se, Te and Po; and any combination of a Group III element such as B, Al, Ga, In, and Tl with a Group V element such as N, P, As, Sb and Bi, but are not limited thereto. In other examples, suitable inorganic nanostructures may comprise metal nanostructures and a suitable metal may be exemplified by Ru, Pd, Pt, Ni, W, Ta, Co, Mo, Ir, Re, Rh, Hf, Nb, Au, Ag, Ti, Sn, Zn, Fe, or FePt, and the like, without being limited thereto.

The wavelength conversion particle, for example, the quantum dot, may have a core-shell structure. Exemplary materials capable of forming the wavelength conversion particles of the core-cell structure include Si, Ge, Sn, Se, Te, B, C (including diamond), P, Co, Au, BN, BP, BAs, AlN, AlP, AlAs, AlSb, GaN, GaP, GaAs, GaSb, InN, InP, InAs, InSb, AlN, AlP, AlAs, AlSb, GaN, GaP, GaAs, GaSb, ZnO, ZnS, ZnSe, ZnTe, CdS, CdSe, CdSeZn, CdTe, HgS, HgSe, HgTe, BeS, BeSe, BeTe, MgS, MgSe, GeS, GeSe, GeTe, SnS, SnSe, SnTe, PbO, PbS, PbSe, PbTe, CuF, CuCl, CuBr, CuI, $Si_3N_4$, $Ge_3N_4$, $Al_2O_3$, $(Al, Ga, In)_2 (S, Se, Te)_3$, $Al_2CO$ and any combination of two or more of these materials, but are not limited thereto.

Exemplary core-cell wavelength conversion particles (core/cell) applicable in the present application include, but are not limited to, CdSe/ZnS, InP/ZnS, PbSe/PbS, CdSe/CdS, CdTe/CdS or CdTe/ZnS, and the like.

Furthermore, the wavelength conversion particles may be polymer particles composed of an organic material. As the kind and size of the polymer particles composed of an organic material, the known ones disclosed in, for example, Korean Laid-open Patent Publication No. 2014-0137676 can be utilized without limitation.

The wavelength conversion particles can be produced in any known manner. For example, method for forming quantum dots, and the like have been known in U.S. Pat. No. 6,225,198, US Laid-open Patent Publication No. 2002-0066401, U.S. Pat. No. 6,207,229, 6,322,901, 6,949,206, 7,572,393, 7,267,865, 7,374,807 or 6,861,155, and in addition to these methods, various other methods may be applied to the present application.

The specific kind of the wavelength conversion particles is not particularly limited and may be appropriately selected in consideration of the desired light emission characteristics.

The wavelength conversion particle may be one whose surface has been modified so as to be capable of comprising one or more ligands or barriers. The ligand or barrier may be advantageous to improve the stability of the wavelength conversion particle and to protect the wavelength conversion particle from harmful external conditions including high temperature, high intensity, external gas or moisture, and the like, and serve to give the wavelength conversion particle the hydrophilic or hydrophobic characteristic.

In one example, the wavelength conversion particle may be one whose surface is modified with a ligand.

As described above, the ligand formed through the surface modification of the wavelength conversion particle serve to allow for exhibiting suitable properties, for example, hydrophilic or hydrophobic characteristics, or binding characteristics with a scattering agent to be described below, on the surface of the wavelength conversion particle, the forming method of which has been known, and such a method can be applied without limitation in the present application. Such materials or methods are disclosed, for example, in US Laid-open Patent Publication No. 2008-0281010, US Laid-open Patent Publication No. 2008-0237540, US Laid-open Patent Publication No. 2010-0110728, US Laid-open Patent Publication No. 2008-0118755, U.S. Pat. No. 7,645,397, 7,374,807, 6,949,206, 7,572,393, or 7,267,875, and the like, but are not limited thereto. In one example, the ligand may be formed by a molecule or polymer having an amine group (oleylamine, triethylamine, hexylamine, naphtylamine, etc.), a molecule or polymer having a carboxyl group (oleic acid, etc.), a molecule or polymer having a thiol group (butanethiol, hexanethiol, dodecanethiol, etc.), a molecule or polymer having a pyridine group (pyridine, etc.), a molecule having a phosphine group (triphenylphosphine, etc.), a molecule having an oxidized phosphine group (trioctylphosphine oxide, etc.), a molecule having a carbonyl group (alkyl ketone, etc.), a molecule or polymer having a benzene ring (benzene, styrene, etc.), a molecule or polymer having a hydroxyl group (butanol, hexanol, etc.) or a molecule or polymer having a sulfone group (sulfonic acid, etc.).

The wavelength conversion particles may be contained in a hydrophilic region or a hydrophobic region formed by polymerizing the composition for an optical film of the present application.

In one example, the wavelength conversion particles may be contained in the hydrophobic region formed by polymerizing the composition for an optical film of the present application, and may not be substantially contained in the hydrophilic region.

In the present application, it may mean the case in which the weight ratio of the wavelength conversion particles contained in the relevant region is 10% or less, 9% or less, 8% or less, 7% or less, 6% or less, 5% or less, 4% or less, 3% or less, 2% or less, 1% or less, 0.5% or less, or 0.1% or less based on the total weight of the wavelength conversion particles contained in the composition for an optical film that the wavelength conversion particles are not substantially contained.

When two regions thus phase-separated are formed and the wavelength conversion particles are contained only in any one region, for example, the hydrophobic region, of the two regions, physical properties suitable for filming the film formed from the composition for an optical film can be ensured, adhesion with another layer such as a barrier layer of an optical film to be described below is advantageously ensured, and other factors which may adversely affect the physical properties of the wavelength conversion particles such as an initiator and a cross-linking agent in a region where the wavelength conversion particles exist on forming the optical film can be more effectively controlled to form a film having excellent durability.

The ratio of the wavelength conversion particles in the composition for an optical film is not particularly limited and for example, may be selected in a suitable range in consideration of the desired optical characteristics, and the like.

For example, the wavelength conversion particles may be included in the composition in a proportion of 0.05 to 20% by weight, 0.05 to 15% by weight, 0.1 to 15% by weight, or 0.5 to 15% by weight, relative to the total solid content of the composition, without being limited thereto.

The composition for an optical film of the present application comprises a polybutadiene compound.

In the present application, the term "polybutadiene compound" may mean an oligomer, homopolymer or copolymer formed by being polymerized from a mixture containing a butadiene monomer.

In one example, the polybutadiene compound may be a homopolymer or copolymer of a butadiene monomer.

The polybutadiene compound, which serves to prevent oxidation of the wavelength conversion particles by being included in a region where the wavelength conversion particles are present in the wavelength conversion layer, may be one having the physical properties, for example, hydrophobic characteristics, of the region including the wavelength conversion particles.

In one example, the polybutadiene compound may be a polybutadiene homopolymer formed by Ziegler-Natta polymerization of a butadiene monomer.

In another example, the polybutadiene compound may be an alternating, random, block or graft copolymer formed by polymerization of a butadiene monomer or a polybutadiene homopolymer and a monomer having a reactive functional group.

Specifically, the polybutadiene compound may be (meth)acryloyl-functionalized polybutadiene or epoxy-functionalized polybutadiene, which is a copolymer of a butadiene monomer and a monomer having a (meth)acryloyl group or an epoxy group, but is not limited thereto.

In one example, the (meth)acryloyl-functionalized polybutadiene may be exemplified by Formula 8 below, but is not limited thereto.

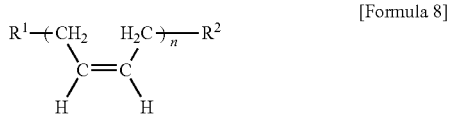

[Formula 8]

wherein $R^1$ and $R^2$ are each independently an alkyl group, a (meth)acryloyl group or a (meth)acryloyloxy group, at least one of $R^1$ and $R^2$ is a (meth)acryloyl group or a (meth)acryloyloxy group, and n is any number, for example, a positive integer.

The epoxy-functionalized polybutadiene may be exemplified by Formula 9 below, but is not limited thereto.

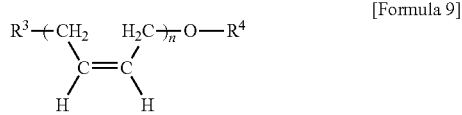

[Formula 9]

In Formula 2 above, $R^3$ and $R^4$ are each independently an alkyl group, an epoxy group or a glycidyl group, at least one of $R^3$ and $R^4$ is an epoxy group or a glycidyl group, and n is any number, for example, a positive integer.

Since the polybutadiene compound plays a role to prevent the wavelength conversion efficiency reduction due to oxidation of the wavelength conversion particles, it can be included in the region containing the wavelength conversion particles.

In one example, the polybutadiene compound may be contained in the hydrophobic region formed by polymerizing the composition for an optical film, and may not be substantially contained in the hydrophilic region. In the present application, it may mean the case in which the weight ratio of the polybutadiene compound contained in the relevant region is 10% or less, 9% or less, 8% or less, 7% or less, 6% or less, 5% or less, 4% or less, 3% or less, 2% or less, 1% or less, 0.5% or less, or 0.1% or less relative to the total weight of the polybutadiene compound contained in the composition for an optical film that the polybutadiene compound is not substantially contained.

As described above, the polybutadiene compound may have physical properties suitable for being contained in any one region of the hydrophilic region and the hydrophobic region in the wavelength conversion layer.

In one example, the polybutadiene compound may have a solubility parameter, which may be measured by the aforementioned method, of less than 10 $(cal/cm^3)^{1/2}$. Within the range of the solubility parameter, the polybutadiene compound can be included in the hydrophobic region of the wavelength conversion layer together with the wavelength conversion particles, and prevent oxidation of the wavelength conversion particles. In another example, the solubility parameter of the polybutadiene compound may be, for example, 3 $(cal/cm^3)^{1/2}$ or more, 4 $(cal/cm^3)^{1/2}$ or more, or about 5 $(cal/cm^3)^{1/2}$ or more.

The polybutadiene compound can be contained in the composition for an optical film in a ratio such that the desired reactivity with oxygen can be maintained and the optical characteristics of the optical film having the wavelength conversion layer formed by polymerization of the composition for optical film can be improved.

For example, the polybutadiene compound may be contained in the composition for an optical film within a range of 1% by weight to 70% by weight relative to the total weight of the solid content of the composition. In the above weight ratio range, the desired oxidation of the wavelength conversion particles can be prevented and ultimately the wavelength conversion efficiency of the composition for an optical film can be increased. In another example, the polybutadiene compound may be included in the composition in a range of 5% by weight to 50% by weight, 10% by weight to 40% by weight, or 15% by weight to 35% by weight, relative to the total weight of the solid content of the composition.

The composition for an optical film of the present application may further comprise a cross-linking agent, if necessary, in consideration of filming physical properties and the like. As the cross-linking agent, for example, a compound having at least two of radically polymerizable groups can be used.

As the compound which can be used as a cross-linking agent, a polyfunctional acrylate can be exemplified. The polyfunctional acrylate may mean a compound containing at least two of acryloyl groups or methacryloyl groups.

As the cross-linking agent, a component, such as known isocyanate cross-linking agents, epoxy cross-linking agents, aziridine cross-linking agents or metal chelate cross-linking agents, that can realize a cross-linking structure by a thermal curing reaction, as well as a component, such as the polyfunctional acrylate, that can realize a cross-linking structure by a radical reaction can be used, if necessary.

For example, the cross-linking agent may be contained in the composition for an optical film in a range of 10% by weight to 50% by weight relative to the total weight of the solid content of the composition for optical films of the present application, without being limited thereto, and the range can be changed in consideration of physical properties of the film, and the like.

The composition for an optical film of the present application may further comprise other components in addition to the above components.

For example, the composition for an optical film of the present application may further comprise, but is not limited to, an antioxidant, amphipathic nanoparticles or scattering particles, and the like.

In one example, the composition for an optical film of the present application may comprise amphipathic nanoparticles. In the present application, the term "amphipathic nanoparticle" may mean nano-dimension particles that include both hydrophilic and hydrophobic properties, and for example, those which are referred to as a so-called surfactant in the art.

The amphipathic nanoparticles may be positioned at the interface between the hydrophilic region and the hydrophobic region formed by polymerization of the composition for an optical film to serve to increase stability of each region.

The amphipathic nanoparticles may have a refractive index different from the aforementioned hydrophilic region and hydrophobic region. Therefore, for example, the generation efficiency of white light can be more increased by scattering or diffusion of light by the amphipathic nanoparticles.

In one example, the amphipathic nanoparticle may comprise a core part and a shell part comprising an amphipathic compound surrounding the core part. Here, the amphipathic compound is a compound which simultaneously contains a hydrophilic site and a hydrophobic site. For example, when the core part is hydrophobic, the hydrophobic site of the shell part in the amphipathic nanoparticle faces the core and the hydrophilic site is disposed externally, so that the amphipathic nanoparticle may be formed overall, and conversely, when the core part is hydrophilic, the hydrophilic site of the shell part in the amphipathic nanoparticle faces the core and the hydrophobic site is disposed externally, so that the amphipathic nanoparticle may be formed overall.

Here, for example, although the core part may have an average particle size within a range of about 10 nm to 1,000 nm, it may be changed according to purposes, without being particularly limited. As the core part, metal particles such as Au, Ag, Cu, Pt, Pd, Ni, Mn or Zn; oxide particles such as $SiO_2$, $Al_2O_3$, $TiO_2$, ZnO, NiO, CuO, $MnO_2$, MgO, SrO or CaO, or particles made of a polymer such as PMMA (polymethacrylate) or PS (polystyrene) can be used.

In addition, as the amphipathic compound of the shell part, Triton X-114 (CAS No. 9036-19-5), Triton X-100 (CAS No. 92046-34-9), Brij-58 (CAS No. 92046-34-9), octyl glucoside (CAS No. 29836-26-8), octylthio glucoside (CAS No. 85618-21-9), decaethylene glycol monodecyl ether (CAS No. 9002-92-0), N-decanoyl-N-methylglucamine (CAS No. 85261-20-7), decyl maltopyranoside (CAS No. 82494-09-5), N-dodecyl maltoside (CAS No. 69227-93-6), nonaethylene glycol monododecyl ether (CAS No. 3055-99-0), N-nonanoyl-N-methylglucamine (CAS No. 85261-19-4), octaethylene glycol monododecyl ether (CAS No. 3055-98-9), Span 20 (CAS No. 1338-39-2), polyvinylpyrrolidone (CAS No. 9003-39-8) or Synperonic F108 (PEO-b-PPO-b-PEO, CAS No. 9003-11-06) can be used, without being limited thereto.

The proportion of the amphipathic nanoparticles in the composition for an optical film of the present invention may be, for example, in a range of 1% by weight to 10% by weight relative to the total weight of the solid content of the composition for an optical film, without being limited thereto, and the above range can be appropriately modified in consideration of the enhancement aspect of stability and wavelength conversion efficiency in the phase-separated structure.

The composition for an optical film of the present application may also comprise scattering particles.

The scattering particles included in the composition for an optical film of the present application can play a role of improving the optical characteristics of the optical film by controlling the probability of introducing light into the wavelength conversion particles.

In the present application, the term "scattering particle" may mean all kinds of particles capable of scattering, refracting or diffusing incident light by having a refracted index different from a surrounding medium, for example, the hydrophilic region and the hydrophobic region of the wavelength conversion layer formed by polymerization of the composition for an optical film, and also an appropriate size.

For example, the scattering particles may have a refractive index lower or higher than the surrounding medium, for example, the hydrophilic region and/or the hydrophobic region, and may be particles that an absolute value of the refractive index difference from the hydrophilic region and/or the hydrophobic region is 0.2 or more, or 0.4 or more. The upper limit of the absolute value of the refractive index difference is not particularly limited, and may be, for example, about 0.8 or less, or about 0.7 or less.

The scattering particles may have a mean particle size of, for example, 100 nm or more, more than 100 nm, 100 nm to 20,000 nm, 100 nm to 15,000 nm, 100 nm to 10,000 nm, 100 nm to 5,000 nm, 100 nm to 1,000 nm, or 100 nm to 500 nm.

The scattering particles may have a shape such as a sphere, an ellipse, a polyhedron or an amorphous shape, but the shape is not particularly limited.

As the scattering particles, for example, particles comprising organic materials such as polystyrene or a derivative thereof, an acrylic resin or a derivative thereof, a silicone resin or a derivative thereof, or a novolac resin or a derivative thereof, or inorganic materials such as silica, alumina, titanium oxide or zirconium oxide can be exemplified. The scattering particles may be formed by comprising only one of the above materials or two or more of the above materials. For example, as the scattering particles, hollow particles such as hollow silica or particles having a core-shell structure can be used.

The ratio of such scattering particles in the composition for an optical film is not particularly limited, and for example, the scattering particles may be contained in the composition for an optical film in an amount of such an extent that can improve the optical characteristics of the optical film having the wavelength conversion layer formed by polymerization of the composition for optical film.

For example, the scattering particles may be included in any one region of the hydrophilic region and the hydrophobic region formed by polymerization of the composition for an optical film.

The composition for an optical film of the present application may further comprise, in addition to the above-mentioned components, additives such as antioxidant particles in the required amount.

The present application also relates to an optical film. The optical film of the present application has a wavelength conversion layer comprising two regions that are phase-separated from each other.

In the present application, the term "phase-separated regions" means regions formed in a state capable of being confirmed that they are separated from each other as regions formed by two regions that do not mix with each other, for example, like a relatively hydrophobic region and a relatively hydrophilic region.

The wavelength conversion layer of the optical film of the present application has a phase separation structure including a hydrophilic region and a hydrophobic region, and comprises the wavelength conversion particles and the polybutadiene compound in the hydrophilic region or the hydrophobic region.

In one example, the wavelength conversion particles and the polybutadiene compound contained in the wavelength conversion layer may be mainly located in any one region of the first region and the second region as described above, for example, the second region.

For example, as shown in FIG. 1, the wavelength conversion layer (100) of the optical film comprises a first region (200) and a second region (300) phase-separated from the first region (200), which may comprise the wavelength conversion particles (301) and the polybutadiene compound (302) in the second region (300).

In one example, the first region of the first region and the second region in the wavelength conversion layer may be a hydrophilic region, and the second region may be a hydrophobic region. In the present application, hydrophilicity and hydrophobicity, which distinguish the first and second regions, are relative concepts to each other, and the absolute criterion of hydrophilicity and hydrophobicity is not particularly limited, as long as it can be confirmed that the two regions are distinguished from each other in the wavelength conversion layer.

The first region and the second region may be randomly distributed, with forming such a cluster that it can be confirmed that the two regions are divided in the wavelength conversion layer.

In one example, the wavelength conversion layer included in the optical film of the present application may be an emulsion type layer.

In the present application, the term "emulsion type layer" may mean a layer having a shape that any one region of two or more phases (for example, the first and second regions) which are not mixed with each other forms a continuous phase in the layer, and the other region is dispersed in the continuous phase to form a dispersed phase. Here, the continuous phase and the dispersed phase may be solid, semi-solid or liquid, respectively, and may be the same phase or different phases from each other. Generally, an emulsion is a term mainly used for two or more liquid phases which do not mix with each other, but the term emulsion in the present application does not necessarily mean an emulsion formed by two or more liquid phases.

In one example, the optical film of the present application has a wavelength conversion layer comprising a continuous phase matrix and a dispersed phase emulsion region dispersed in the continuous phase matrix, which may comprise wavelength conversion particles and a polybutadiene compound present in the continuous phase matrix or the emulsion region of the wavelength conversion layer.

The optical film of the present application can maximize the wavelength conversion efficiency of the wavelength conversion layer by locating the wavelength conversion particles and the polybutadiene compound in the matrix or the emulsion region of the wavelength conversion layer.

In one example, the wavelength conversion particles may be included in the emulsion region in the wavelength conversion layer of the optical film.

The wavelength conversion particles contained in the emulsion region may be, for example, 90% by weight or more, 91% by weight or more, 92% by weight or more, 93% by weight or more, 94% by weight or more, 95% by weight or more, 96% by weight or more, 97% by weight or more, 98% by weight or more, 99% by weight or more, 99.5% by weight or more, or 99.9% by weight or more, relative to the total weight of the wavelength conversion particles included in the wavelength conversion layer.

If two regions as phase-separated are formed in the wavelength conversion layer and the wavelength conversion particles are substantially located only in any one region, for example, the emulsion region, of the two regions, physical properties suitable for filming the film can be ensured, adhesion between another layer such as a barrier layer to be described below and the wavelength conversion layer is advantageously ensured, and other factors which may adversely affect the physical properties of the wavelength conversion particles such as an initiator and a cross-linking agent in a region where the wavelength conversion particles exist on forming the optical film can be more effectively controlled to form a film having excellent durability.

In one example, the polybutadiene compound may be included in the emulsion region in the wavelength conversion layer of the optical film.

The polybutadiene compound contained in the emulsion region may be, for example, 90% by weight or more, 91% by weight or more, 92% by weight or more, 93% by weight or more, 94% by weight or more, 95% by weight or more, 96% by weight or more, 97% by weight or more, 98% by weight or more, 99% by weight or more, 99.5% by weight or more, or 99.9% by weight or more, relative to the total weight of the polybutadiene compound contained in the wavelength conversion layer.

When the polybutadiene compound is included in the emulsion region at the above ratio, the wavelength conversion particles can be effectively protected from external factors that can reduce the wavelength conversion efficiency of the wavelength conversion particles, such as oxygen.

The matrix or emulsion region contained in the wavelength conversion layer of the optical film may be one formed by polymerization of the above-described hydrophilic polymerizable compound or hydrophobic polymerizable compound.

In one example, any one of the matrix and the emulsion region included in the wavelength conversion layer may comprise a polymerized unit of a hydrophilic polymerizable compound and the other may comprise a polymerized unit of a hydrophobic polymerizable compound.

The matrix included in the wavelength conversion layer of the optical film may be a continuous phase, for example, one formed by polymerization of a hydrophilic polymerizable compound.

In one example, the matrix included in the wavelength conversion layer may comprise a polymerized unit of any one compound selected from the group consisting of a compound of Formula 1 below; a compound of Formula 2 below; a compound of Formula 3 below; a compound of Formula 4 below; a radically polymerizable nitrogen-containing compound; and a radically polymerizable compound comprising (meth)acrylic acid or a salt thereof.

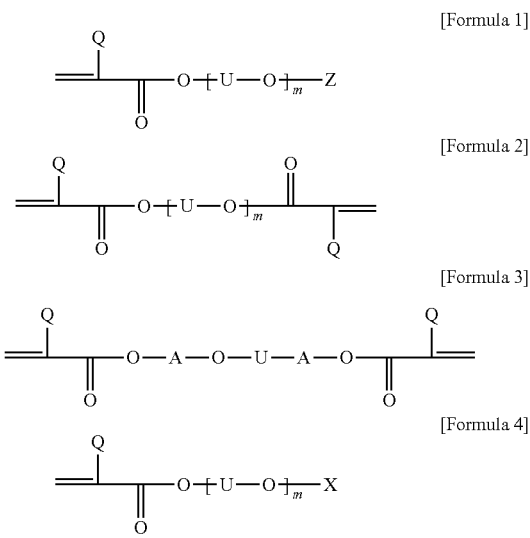

In Formulas 1 to 4, each Q is independently hydrogen or an alkyl group, each U is independently an alkylene group, each A is independently an alkylene group which may be substituted with a hydroxyl group, Z is a hydrogen, an alkoxy group or a monovalent hydrocarbon group, X is a hydroxyl group or a cyano group, and m and n are any number.

The emulsion region contained in the wavelength conversion layer of the optical film may be one dispersed in the continuous phase matrix, for example, in the form of particles.

In one example, the emulsion region may be in the form of particles having an average diameter in a range of 1 μm to 200 μm. In another example, the emulsion region may be in the form of particles having an average diameter in a range of about 1 μm to 50 μm, or in a range of about 50 μm to 200 μm. The size of the form of particles can be controlled by regulating the ratio of the material forming the matrix and the emulsion region, or by using a surfactant or the like.

Such an emulsion region may be, for example, one formed by polymerization of the above-mentioned hydrophobic polymerizable compound.

Specifically, the emulsion region may comprise a polymerized unit of any one compound selected from the group consisting of a compound of Formula 5 below, a compound of Formula 6 below and a compound of Formula 7 below.

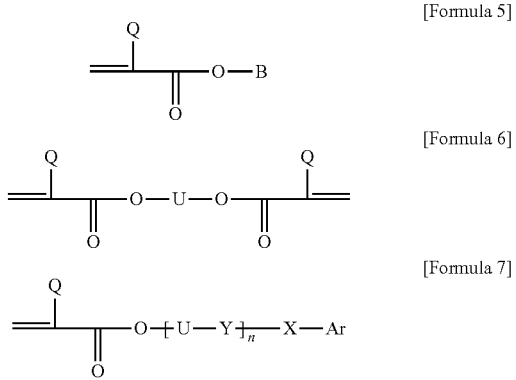

[Formula 5]

[Formula 6]

[Formula 7]

In Formulas 5 to 7, each Q is independently hydrogen or an alkyl group, each U is independently an alkylene group, an alkenylene group or an alkynylene group or an arylene group, B is a linear or branched alkyl group having 5 or more carbon atoms or an alicyclic hydrocarbon group, Y is an oxygen atom or a sulfur atom, X is an oxygen atom, a sulfur atom or an alkylene group, Ar is an aryl group, and n is any number.

The emulsion region may comprise, for example, wavelength conversion particles, and the wavelength conversion particles contained in the emulsion region may be the above-described green particles and/or red particles.

In one example, the wavelength conversion particles in the emulsion region may comprise green particles and red particles at the same time, where each of the particles may be located in different regions of the emulsion region.

Specifically, the emulsion region may comprise an A region comprising first wavelength conversion particles capable of absorbing light within a range of 420 nm to 490 nm to emit light within a range of 490 nm to 580 nm and/or a B region comprising second wavelength conversion particles capable of absorbing light within a range of 420 nm to 490 nm to emit light within a range of 580 nm to 780 nm.

Thus, when two kinds of wavelength conversion particles, such as green particles and red particles, are contained in the emulsion region, the interaction that may occur between each particle may be minimized by controlling the region where each particle is located to increase color purity, and the like.

The ratio of the matrix and the emulsion region in the wavelength conversion layer may be selected in consideration of, for example, the ratio of the wavelength conversion particles intended to be included in the wavelength conversion layer, the adhesion with other layers such as the barrier layer, the generation efficiency of the emulsion structure as the phase-separated structure, or the physical properties required for filming the film, and the like.

For example, the wavelength conversion layer may comprise 5 to 40 parts by weight of the emulsion region relative to 100 parts by weight of the matrix. The ratio of the emulsion region may be at least 10 parts by weight or at least 15 parts by weight relative to 100 parts by weight of the matrix. The ratio of the emulsion region may be 35 parts by weight or less relative to 100 parts by weight of the matrix. Here, the ratio of the weight of the matrix and the emulsion region is the ratio of the weight of each region itself, or may mean the sum of the weights of all components contained in the region or the ratio of the main component or the weight of the materials used to form each of the regions. For example, the matrix and emulsion region may comprise polymerized units of hydrophilic and hydrophobic polymerizable compounds, wherein the ratio of the weight may be a ratio between the polymerized units.

The optical film of the present application may further comprise a barrier layer on the wavelength conversion layer. In one example, the optical film may comprise a barrier layer on one side or both sides of the wavelength conversion layer.

Such a barrier layer can protect the wavelength conversion layer from high temperature conditions or conditions that harmful external factors such as oxygen and moisture exist.

FIG. 2 shows, as one exemplary optical film (400), a structure including a wavelength conversion layer (100) and barrier layers (500) disposed on both sides thereof. For example, the barrier layer may be formed of a material being hydrophobic and having good stability such that yellowing and the like are not caused even when exposed to light.

In one example, the barrier layer may be selected so as to generally have a refractive index in a range similar to the wavelength conversion layer in order to reduce the loss of light and the like at the interface between the wavelength conversion layer and the barrier layer.

The barrier layer may be, for example, a solid material, or a cured liquid, gel, or polymer, and may be selected from materials that are flexible or non-flexible depending upon applications. The kind of the material forming the barrier layer is not particularly limited and can be selected from known materials including glass, polymers, oxides, nitrides, and the like. The barrier layer may comprise, for example, glass; polymers such as PET (poly(ethylene terephthalate)); or oxides or nitrides of silicon, titanium or aluminum, and the like or a combination of two or more of the above materials, but is not limited thereto.

As shown exemplarily in FIG. 2, the barrier layer may be present on both surfaces of the wavelength conversion layer, or may exist only on either surface thereof. In addition, the optical film may have a structure in which a barrier layer exists on sides as well as both surfaces, whereby the wavelength conversion layer is entirely sealed by the barrier layer.

The present application also relates to a method for producing an optical film.

In one example, the present application relates to a method for producing an optical film comprising a step of mixing wavelength conversion particles and a polybutadiene compound with a hydrophilic polymerizable compound and a hydrophobic polymerizable compound phase-separated from the hydrophilic polymerizable compound after polymerization.

The method of mixing the wavelength conversion particles and the polybutadiene compound with the hydrophilic polymerizable compound and the hydrophobic polymerizable compound can be exemplified by, for example, a method of mixing the wavelength conversion particles, the polybutadiene compound, the hydrophilic polymerizable compound and the hydrophobic polymerizable compound; or a method of preparing a hydrophilic polymerizable composition comprising the hydrophobic polymerizable compound and an initiator and a hydrophobic polymerizable composition comprising the hydrophobic polymerizable compound, the wavelength conversion particles, the polybutadiene compound, and an initiator separately, and then mixing both compositions, and the like.

According to the above method, phase separation may occur in a curing process, specifically a polymerization process to form a wavelength conversion layer comprising the phase-separated continuous phase matrix having the above-mentioned type and the emulsion region dispersed in the matrix. In addition, by allowing the wavelength conversion particles and the polybutadiene compound to be contained in any one region of the two regions of the wavelength conversion layer, specifically the emulsion region, it is possible to prevent a problem that the wavelength conversion efficiency of the wavelength conversion particles is lowered due to external factors such as an initiator and oxygen, and the like.

The method of forming the wavelength conversion layer may include, for example, coating the mixed material with a known coating method on a suitable substrate to form a layer.

Also, the method of curing the layer formed in the above manner is not particularly limited, and for example, it can be performed by a method of applying such an appropriate range of heat that the initiator can be activated or applying an electromagnetic wave such as ultraviolet.

In the method for producing the optical film of the present application, the step of forming the barrier layer may be further performed after forming the wavelength conversion layer through the above step or the polymerization process may be also performed in a state adjacent to the barrier layer.

The present application also relates to a lighting device. An exemplary lighting device may comprise a light source and the optical film.

In one example, the light source and the optical film in the lighting device may be arranged such that the light irradiated from the light source may enter the optical film. If the light irradiated from the light source enters the optical film, some of the incident light may be emitted as it is, without being absorbed by the wavelength conversion particles in the optical film, while others may be emitted as light having a different wavelength after being absorbed by the wavelength conversion particles. Accordingly, by controlling the wavelength of the light emitted from the light source and the wavelength of the light emitted by the wavelength conversion particles, it is possible to control the color purity or color of the light emitted from the optical film, thereby providing an optical film having increased luminous efficiency.

In one example, if the wavelength conversion layer comprises the above-mentioned red and green particles in an appropriate amount and the light source is adjusted to emit blue light, then white light may be emitted in the optical film.

The type of the light source included in the lighting device of the present application is not particularly limited, and an appropriate type can be selected in consideration of the desired type of light. In one example, the light source is a blue light source, and may be, for example, a light source capable of emitting light having a wavelength within a range of 420 to 490 nm.

FIGS. 3 and 4 are drawings exemplarily showing lighting devices comprising a light source and an optical film as described above.

As shown in FIGS. 3 and 4, the light source and the optical film in the lighting devices can be arranged so that the light irradiated from the light source can enter the optical film.

In FIG. 3, the light source (600) is disposed below the optical film (400), whereby the light irradiated from the light source (600) in the upward direction can enter the optical film (400).

FIG. 4 is a case where the light source (600) is disposed on the side of the optical film (400). Although it is not essential, when the light source (600) is disposed on the side of the optical film (400) as described above, other means that light from the light source (600) may enter the optical film (400) more efficiently, like a light guiding plate (700) or a reflection plate (800), may be also included.

The examples shown in FIGS. 3 and 4 are one example of the lighting devices of the present application, and besides, the lighting device may have various known shapes and may further comprise various known configurations for this purpose.

The lighting device of the present application as described above can be used for various applications. A typical application to which the lighting device of the present application may be applied is a display device. For example, the lighting device can be used as a BLU (Backlight Unit) of a display device such as an LCD (Liquid Crystal Display).

In addition, the lighting device may be used in a BLU (backlight unit) of a display device such as a computer, a mobile phone, a smart phone, a personal digital assistant (PDA), a gaming device, an electronic reading device or a digital camera, indoor or outdoor lighting, stage lighting, decorative lighting, accent lighting, or museum lighting, and the like, and besides, it may be used in special wavelength lighting required for horticulture or biology, and the like, but the application to which the lighting device can be applied is not limited to the above.

Hereinafter, the optical film of the present application and the like will be specifically described by way of examples and comparative examples, but the scope of the optical film and the like is not limited to the following examples.

Example 1

Preparation of Composition (A1) for Optical Film

PEGDA (poly(ethyleneglycol) diacrylate, CAS No. 26570-48-9, solubility parameter (HSP): about 18 $(cal/cm^3)^{1/2}$), LA (lauryl acrylate, CAS No. 2156-97-0, solubility parameter (HSP): about 8 $(cal/cm^3)^{1/2}$), bisfluorene diacrylate (BD, CAS No. 161182-73-6, solubility parameter (HSP): about 8 to 9 $(cal/cm^3)^{1/2}$), green particles (quantum dot particles), a surfactant (polyvinylpyrrolidone), $SiO_2$ nanoparticles and a polybutadiene compound having a solubility parameter of 8.3 $(cal/cm^3)^{1/2}$ (CAS No. 31567-90-5) were mixed in a weight ratio of 9:1:1:0.1:0.05:0.05:0.2 (PEGDA: LA:BD:green particles:surfactant:$SiO_2$ nanoparticles:polybutadiene compound). Subsequently, Irgacure 2959 and Irgacure 907 as radical initiators were mixed to be a concentration of about 1% by weight, respectively, and stirred for about 6 hours to prepare a composition (A1) for an optical film.

Manufacture of Optical Film

The composition (A1) for an optical film was located to a thickness of about 50 μm between two sheets of barrier films (i-component) disposed apart at certain intervals, irradiated with ultraviolet to induce radical polymerization, and cured to manufacture an optical film comprising phase-separated regions.

Comparative Example 1

An optical film was manufactured in the same manner as Example 1, except that the composition (B1) for an optical film containing no polybutadiene compound was used.

Experimental Example—Evaluation of Relative Wavelength Conversion Efficiency Over Time For the optical films of Example 1 and Comparative Example 1, relative wavelength conversion efficiency over time was evaluated under an oven condition of 60° C.

As a result of the evaluation, as shown in FIG. 5, when the composition for an optical film contained polybutadiene in a predetermined amount, the degree of decrease in the wavelength conversion efficiency over time appeared to be low, compared to Comparative Example without polybutadiene.

That is, when the optical film was formed using the composition for an optical film containing polybutadiene, it could be confirmed that the oxidation of the wavelength conversion particles by oxygen or the like is prevented, so that the decrease of the wavelength conversion efficiency over time can be prevented.

DESCRIPTION OF SYMBOLS

100: wavelength conversion layer
200: first region
300: second region
301: wavelength conversion particle
302: polybutadiene compound
400: optical film
500: barrier layer
600: light source
700: light guiding plate
800: reflective layer

The invention claimed is:

1. A composition for an optical film, comprising:
   a hydrophilic polymerizable compound having a solubility parameter of 11-40 $(cal/cm^3)^{1/2}$;
   a hydrophobic polymerizable compound having a solubility parameter of 3-10 $(cal/cm^3)^{1/2}$ that is phase-separated from said hydrophilic polymerizable compound after polymerization;
   wavelength conversion particles; and
   a polybutadiene compound having a solubility parameter of less than 10 $(cal/cm^3)^{1/2}$,
   wherein a difference between the solubility parameter of the hydrophilic polymerizable compound and the solubility parameter of the hydrophobic polymerizable compound is 5-30 $(cal/cm^3)^{1/2}$.

2. The composition for an optical film according to claim 1, wherein
   the polybutadiene compound is a homopolymer or copolymer of a butadiene monomer.

3. The composition for an optical film according to claim 2, wherein
   the copolymer of butadiene is a (meth)acryloyl functionalized polybutadiene or an epoxy functionalized polybutadiene.

4. The composition for an optical film according to claim 1, wherein
   the polybutadiene compound is contained in a range of 1% by weight to 70% by weight relative to the total weight of the solid content of the composition.

5. The composition for an optical film according to claim 1, comprising 100 parts by weight of the hydrophilic polymerizable compound and 10 to 100 parts by weight of the hydrophobic polymerizable compound.

6. The composition for an optical film according to claim 1, wherein:
   the hydrophilic polymerizable compound is any one selected from the group consisting of a compound of Formula 1 below, a compound of Formula 2 below, a compound of Formula 3 below, a compound of Formula 4 below, a radically polymerizable nitrogen-containing compound, and a radically polymerizable compound containing (meth)acrylic acid or a salt thereof:

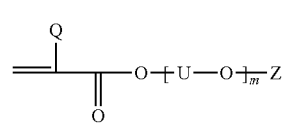
[Formula 1]

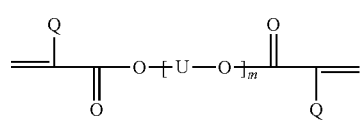
[Formula 2]

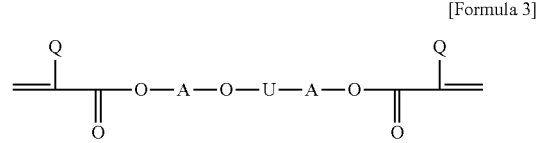
[Formula 3]

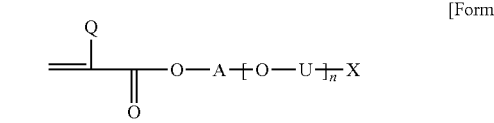
[Formula 4]

wherein:
   each Q is independently hydrogen or an alkyl group;
   each U is independently an alkylene group;
   each A is independently an alkylene group which may be substituted with a hydroxyl group;
   Z is a hydrogen, an alkoxy group or a monovalent hydrocarbon group;
   X is a hydroxyl group or a cyano group; and
   m and n are any number.

7. The composition for an optical film according to claim 1, wherein:
   the hydrophobic polymerizable compound is any one selected from the group consisting of a compound Formula 5 below, a compound Formula 6 below, and a compound Formula 7 below:

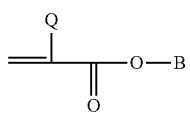
[Formula 5]

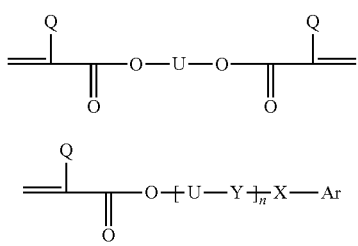

[Formula 6]

[Formula 7]

wherein:
   each Q is independently hydrogen or an alkyl group;
   each U is independently an alkylene group, an alkenylene group or an alkynylene group or an arylene group;
   B is a linear or branched alkyl group having 5 or more carbon atoms or an alicyclic hydrocarbon group;
   Y is an oxygen atom or a sulfur atom;
   X is an oxygen atom, a sulfur atom or an alkylene group;
   Ar is an aryl group; and
   n is any number.

8. The composition for an optical film according to claim 1, wherein
   the wavelength conversion particle is a quantum dot or a polymer particle.

9. The composition for an optical film according to claim 1, wherein
   the wavelength conversion particle is a first wavelength conversion particle capable of absorbing light within a range of 420 to 490 nm to emit light within a range of 490 to 580 nm, or a second wavelength conversion particle capable of absorbing light within a range of 420 to 490 nm to emit light within a range of 580 to 780 nm.

10. An optical film, comprising:
   a wavelength conversion layer, comprising:
      a polymerized composition of claim 1;
      a continuous phase matrix;
      an emulsion region dispersed in said continuous phase matrix; and
      wavelength conversion particles and a polybutadiene compound present in the continuous phase matrix or the emulsion region of said wavelength conversion layer.

11. The optical film according to claim 10, wherein the weight ratio of the wavelength conversion particles contained in the emulsion region is 90% or more based on the total weight of the wavelength conversion particles contained in the wavelength conversion layer.

12. The optical film according to claim 10, wherein the weight ratio of the polybutadiene compound contained in the emulsion region is 90% or more based on the total weight of the polybutadiene compound contained in the wavelength conversion layer.

13. The optical film according to claim 10, wherein the emulsion region is in the form of particles having an average diameter in a range of 1 μm to 200 μm.

14. The optical film according to claim 10, wherein the continuous phase matrix comprises a polymerized unit of any one compound selected from the group consisting of a compound of Formula 1 below, a compound of Formula 2 below, a compound of Formula 3 below, a compound of Formula 4 below, a radically polymerizable nitrogen-containing compound, and a radically polymerizable compound comprising (meth)acrylic acid or a salt thereof:

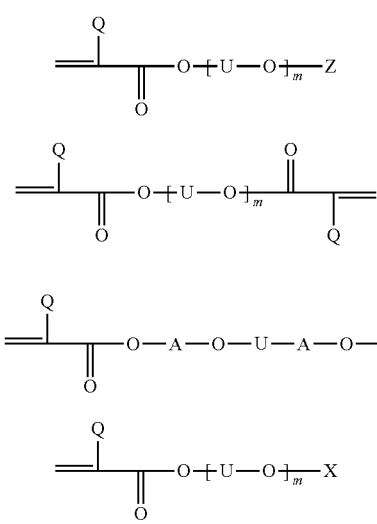

wherein:
   each Q is independently hydrogen or an alkyl group;
   each U is independently an alkylene group;
   each A is independently an alkylene group which may be substituted with a hydroxyl group;
   Z is a hydrogen, an alkoxy group or a monovalent hydrocarbon group;
   X is a hydroxyl group or a cyano group; and
   m and n are any number.

15. The optical film according to claim 10, wherein the emulsion region comprises a polymerized unit of any one compound selected from the group consisting of a compound of Formula 5 below, a compound of Formula 6 below, and a compound of Formula 7 below:

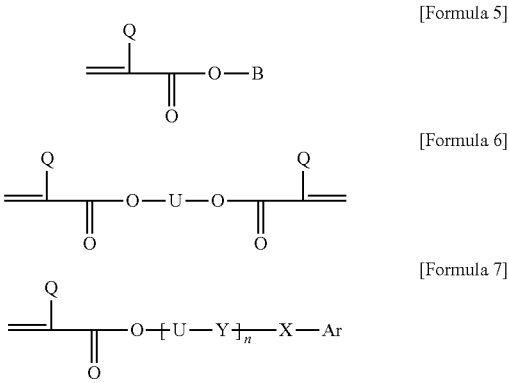

wherein:
   each Q is independently hydrogen or an alkyl group;
   each U is independently an alkylene group, an alkenylene group or an alkynylene group or an arylene group;
   B is a linear or branched alkyl group having 5 or more carbon atoms or an alicyclic hydrocarbon group;
   Y is an oxygen atom or a sulfur atom;
   X is an oxygen atom, a sulfur atom or an alkylene group;
   Ar is an aryl group; and
   n is any number.

16. The optical film according to claim 10, wherein
   the emulsion region comprises an A region comprising first wavelength conversion particles capable of absorbing light within a range of 420 nm to 490 nm to emit light within a range of 490 nm to 580 nm and/or a B region comprising second wavelength conversion particles capable of absorbing light within a range of 420 nm to 490 nm to emit light within a range of 580 nm to 780 nm.

17. The optical film according to claim 10, further comprising a barrier layer on the wavelength conversion layer.

18. A lighting device comprising a light source and the optical film of claim 10, wherein said light source and said optical film are arranged such that light from said light source can enter said optical film.

19. A display device comprising the lighting device of claim 18.

* * * * *